Dec. 24, 1940.     W. DORN     2,225,770
VARIABLE CONDENSER
Filed June 1, 1937     2 Sheets-Sheet 1
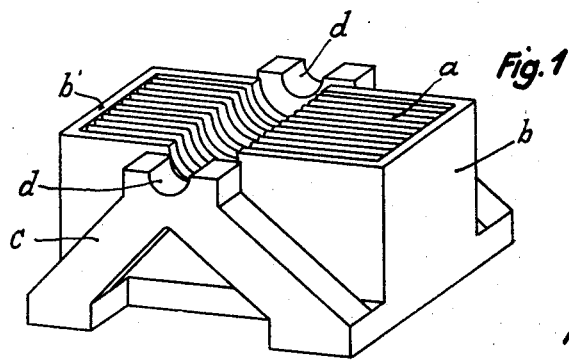
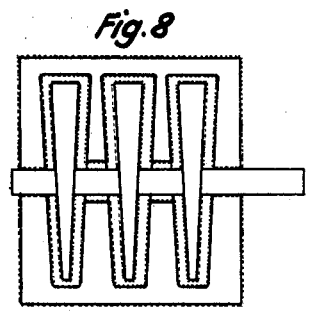
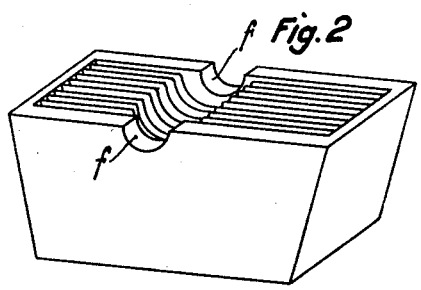
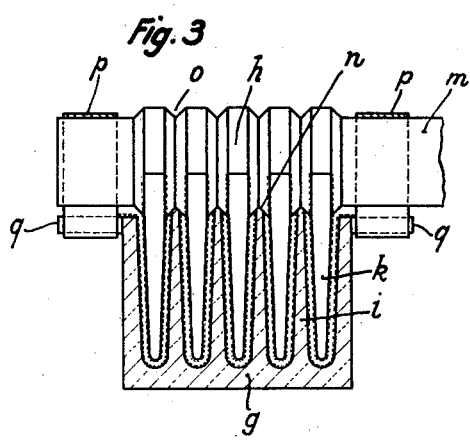
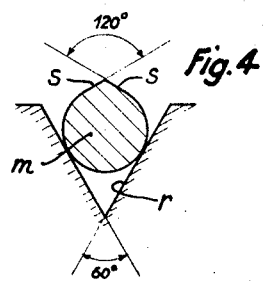

Dec. 24, 1940.  W. DORN  2,225,770
VARIABLE CONDENSER
Filed June 1, 1937  2 Sheets-Sheet 2
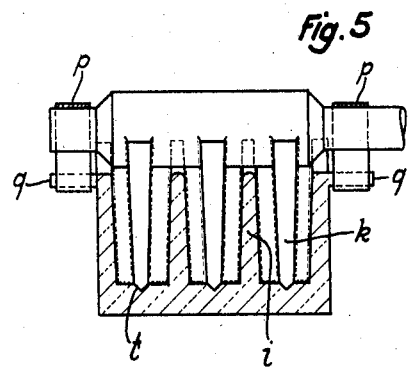
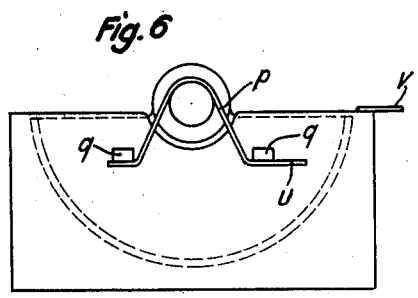
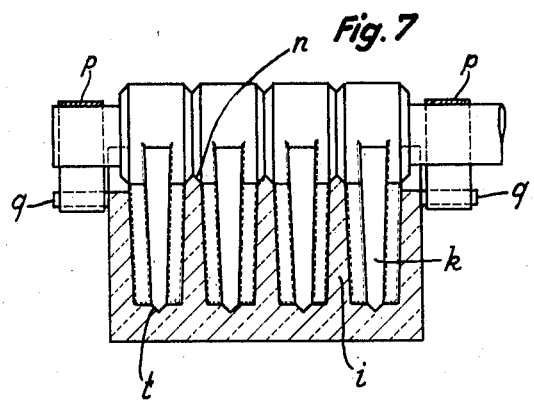
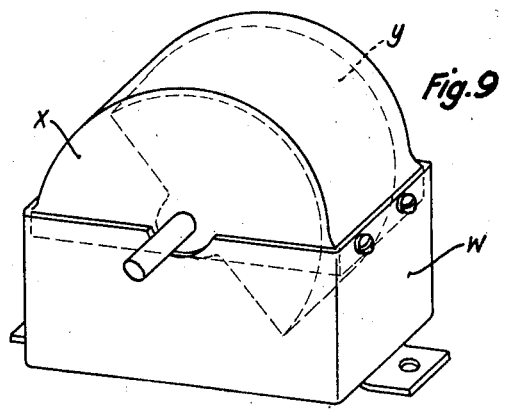
Inventor
Walter Dorn
by Roy F. Steward
his attorney Patented Dec. 24, 1940

2,225,770

UNITED STATES PATENT OFFICE 2,225,770

VARIABLE CONDENSER

Walter Dorn, Stuttgart, Germany, assignor to Robert Bosch Gesellschaft mit beschränkter Haftung, Stuttgart, Germany Application June 1, 1937, Serial No. 145,842
In Germany June 2, 1936

3 Claims. (Cl. 175—41.5)

It is known in condensers of the kind having several separate systems variable by movement in the same direction and in parallel, to make several fixed or movable sets of plates from a single metallised insulating piece of pressed or moulded material. It is here a question of condensers in which the plates are moved relative to each other by a rectilinear movement. The use of such constructions for variable condensers with a turning movement has hitherto not been recommended.

The invention consists of a variable condenser in which several stator plates, together with the bearings of the rotor, form a unit, and are made from a thermoplastic or hardenable insulating material. By this unitary combination of stator plates and rotor bearings great strength is obtained for the whole arrangement, so that the employment of thermoplastic or hardenable insulating materials for the manufacture of the plates of variable condensers is made possible. The so-called synthetic resins (phenol-formaldehyde condensation products, urea resins, glyptal resins), or the various thermoplastic synthetic materials, such for instance as the polystyrols, are suitable as the insulating material. All these materials may be mixed with fillers to improve their mechanical and thermal properties and also to cheapen them.

Examples of construction of the invention are shown in the accompanying drawings, in which—

Figures 1 and 2 show in perspective two different stators for variable condensers made according to the invention.

Figure 3 is a section through a stator with built-in rotor, which is mounted on the stator plates.

Figure 4 is an enlarged fragmentary sectional view of a construction of the bearings of the rotor.

Figure 5 shows a similar section to Figure 3, but of another construction in which the rotor is mounted in the stator between the stator plates.

Figure 6 is an elevation of a condenser as in Figure 5, looking in the axial direction.

Figure 7 shows in section a combination of the two constructions of Figures 3 and 5.

Figure 8 shows a variable condenser having wedge-shaped plates.

Figure 9 shows in perspective a preferred general arrangement of a variable condenser.

In the stator shown in Figure 1, the stator plates $a$, the stator casing $b$, and the bearing supports $c$, including the bearing plates $d$ provided on them for the rotor, consist of a single piece of a thermoplastic or hardenable injection moulded insulating material. All the inner surfaces of the stator are metallized, so that the plates can serve as condenser plates. The metallizing preferably extends up to and includes the upper horizontal surface $b'$ in which the current connection for the stator can be made. For screening purposes the external surface of the stator casing may also be metallized.

In the arrangement shown in Figure 2, the bearing places $f$ of the rotor are directly situated in the stator casing. Here also the stator plates and the casing are made from a single piece of insulating material.

In the construction shown in Figure 3, $g$ denotes the stator and $h$ the rotor. $i$ are the stator plates and $k$ the rotor plates. The plates are shown greatly exaggerated in their extension in the direction of the shaft of the rotor. Also, the spacing of the plates is, in reality, smaller and the number of the plates greater. The other dimensions however correspond substantially to a practical example. Just as the stator plates $i$ with the stator casing are made in one piece, so also the rotor plates $k$ together with the rotor hub and the shaft $m$, are also made from one piece of insulating material. In some cases, the insulating material forming the rotor shaft is moulded or injection moulded round a metal or ceramic axis for strengthening purposes. The plates $i$ and $k$ are thicker towards their points of junction with the casing and the hub part respectively, so that thereby their resistance to alterations in form is increased. Furthermore, they can thereby be more easily removed from the moulds for the pressing or injection moulding operations. Preferably, the plates are given the form of flat double cones.

In order to further increase the capacity of resistance of the plates to alterations in form, it is advisable to make the difference between the external diameter of the plates and the external diameter of the hubs smaller than is the case in the known variable condensers. This is best obtained by making the external diameter of the hubs larger than in the known variable condensers. The loss in capacity thereby entailed by reducing the plate surface can be very simply compensated for by making the external diameter of the plate $a$ little larger. The increase of the external diameter of the plates is however then substantially smaller than the increase of the external diameter of the hub. It is preferable to make the ratio of the external diameter of the plates to the external diameter of the hub not greater than 3. As in this case the hub is very thick, the hub and thus also the shaft may be made hollow to save material.

In the construction shown in Figure 3, the rotor $h$ is mounted at $n$ on the ends of the stator plates $i$, the ends of the stator plates each being provided with a semi-circular recess or bearing surface to receive and rotatably support the rotor, the terminal edges of the recessed portions of the stator plates being pointed or V-shaped and engaging in complementary V-shaped annular grooves or notches $o$ in the rotor hub. This mode of mounting ensures at the same time a spacing between the stator plates which always remains uniform, since this spacing is unequivocally determined by the spacing of the notches or annular V-shaped grooves $o$ in the rotor hub serving as bearing places. By a leaf-spring $p$ at each of the two ends of the rotor shaft this latter is pressed down on its bearings. The leaf-springs $p$ are held by extensions $q$ which are integral with the stator.

The metallized surfaces of the plates are indicated in the drawings by broken lines. In the arrangement shown in Figure 3 the whole inner surface of the stator is metallized. In the rotor, however, a break in the metallizing is necessary at the bearing points $n$, so that there the coatings of the stator and rotor may not short-circuit each other. Conversely however, a break may be provided in the metallizing of the stator at these places, and the rotor metallized throughout, or a break in the metallizing may be provided there both in the stator and in the rotor.

These gaps in the metallizing must however, be larger the greater the phase angle is of the insulating material employed in order to avoid additional losses. As it is desirable from considerations of economy and also for manufacturing reasons to utilize the available surface as completely as possible, a material having as small a phase angle as possible will preferably be used for making the condensers, for instance the above mentioned polystyrols, which have also the important advantage for the manufacture of being easy to mould by injection into moulds under pressure. For the injection moulding the insulating material known under the name "Luvican" is also particularly suitable.

The metallic connection between the metal coatings of the separate plates can be obtained by bridging over the metallizing of the plates, by a metallizing outside the bearing places that are to be kept free from metal, and done, for example, in the same working operation. In the arrangement in Figure 3, this bridging would be done on the side of the rotor hub turned away from the rotor plates.

For taking current from the rotor the same springs $p$ can be used as serve also for pressing down the rotor in its bearings. If the metallizing of the rotor is extended to the places on which the springs $p$ rub, these springs can rub directly on the metal coating. In such an arrangement however there is the risk of the metal coating rubbing through in time. It is better therefore to have a collecting ring pressed or injection moulded in with the rotor shaft at this place. This metal ring then comes into electrical connection with the plate coating by the metallizing or by inlaid metal strips.

The mounting of the rotor may also be made, as shown in Figure 4, as a movement stop. In this case angular recesses $r$ which include for instance, an angle of 60°, are provided in the stator plates $i$. The rotor shaft $m$ then has, in addition to its round part, also two flat surfaces $s$, which in the example form an angle of 120° with each other. At the end of the rotary movement one of the two flat surfaces comes to bear on a bearing surface of the stator plates and thereby prevents the further rotation.

In Figure 5 a rotor mounting is shown in which the rotor plates are mounted between the stator plates, the pointed ends or peripheral edges of the rotor plates engaging in and being rotatably supported by the arcuate V-shaped grooves or bearing places $t$ provided in the stator. In this arrangement the distances between the rotor plates are unequivocally fixed by the distance between the bearing places or grooves provided in the stator. In this example, not only the thickness of the plates, but especially also the spacing of the plates, are shown greatly exaggerated for the sake of greater clearness.

Figure 6 is an elevation of the general arrangement of the condenser shown in Figure 5, looking in the direction of the condenser shaft $p$ are the springs for taking off the current and pressing down the rotor. One end $u$ of the spring acts as a current terminal for the rotor. $v$ is the connection contact of the stator.

A combination of the rotor mountings shown in Figures 3 and 5 is shown in Figure 7. Here, the rotor is mounted both with its plates between the stator plates at $t$, and also with its hub on the stator plates at $n$. By the mounting at the places $t$ the spacing between the rotor plates is unequivocally determined, and by the mounting at the places $n$ the spacing of the stator plates is determined.

In order to influence the capacity curve the plates may be given any desired form and thickness. Thus, for example, Figure 8 shows a condenser having wedge-shaped plates.

The condensers made from insulating material in the manner described may, if required, also be inserted in a metal casing. This metal casing need not, however, like the known metal casing of variable condensers, have exact dimensions, but only the hole spacings important for the assembling need be provided. Figure 9 shows such an arrangement. Here, $w$ indicates the metal casing, which for example may be die cast from zinc or aluminium. The stator $x$, made from insulating material, is arranged above the casing. The rotor $y$ can be moved downwards out of the stator. The rotor is preferably so connected up that it receives high frequency potential, while the metallizing of the stator and the metal casing $w$ are connected to earth. In this way the electric lines of force do not run through the insulating material when the rotor is rotated out, but principally through air, so that in the outwardly turned position of the rotor a very small initial capacity with the smallest possible phase angle is obtained.

For the metallizing of the condenser plates those processes are particularly suitable in which as little heat as possible is produced on the plates to be metallized. The deposition processes working in vacuo, for instance the cathode spluttering and the thermal metal vaporizing processes, or a combination of the two, are very suitable for the purpose. In the thermal vaporization process the metal to be deposited is first vaporized and then deposited from the metal vapour on the surface to be metallized. The vaporizing has the advantage that it is very rapid, and that a number of cheap and good-conducting metals can be used for the purpose. Besides cadmium and zinc, which have the advantage of low vaporizing points, copper and silver more especially are suitable for the vaporizing, owing to their good conductivity and their comparatively good chemical resistance.

In the metallizing of condensers in which, with a view to the mounting of the rotor, places free from metal must be provided at the places where the stator and rotor are in contact (see Figs. 3, 5 and 7), or for other reasons, these metal-free places can be produced by, first, metallizing the whole surface, and subsequently removing the metal coating at the places in question. The metal-free places may however be obtained more simply, by covering them with a deposition-inhibiting substance before the deposition of the metal. In the vacuum processes, substances which give off vapours on heating in vacuo are particularly suitable as deposition-inhibiting substances. A cushion of vapour is thereby produced which does not allow deposition to take place. Such deposition-inhibiting substances are, for instance hydrocarbons or greases. It is thus only necessary to smear with grease the places to be kept free from metal before the metallizing.

In order to equalize the condensers made according to the invention to a prescribed value, individual lamellae or plates in the stator or rotor can be bent with a warm tool. A special tuning plate of metal provided with incisions may also be injection moulded in with the piece of insulating material, and then the parts of the plate situated between the incisions bent in the usual way.

With a view to utilizing space to the best possible advantage, it is however advisable to effect the tuning or adjustment, not by bending, but instead of this partly to destroy the conductivity of the metal coating at the place in question, and so to alter the capacity. The coating may in this case be destroyed by a chemical method, for instance by acids, or burning it away with a flame or by an electric current.

I declare, that what I claim is:

1. A variable condenser comprising a stator member and a rotor member each provided with plates, one of said members being provided with V-shaped grooves formed therein concentric with the axis of the rotor and forming bearing surfaces for receiving wedge-shaped portions formed on the plates of the other member for rotatably supporting the rotor member on the stator member.

2. A variable condenser comprising a rotor and a stator each comprising a plurality of plates and a mounting therefor formed as an integral unit of insulating material, and a metal coating on said plates, said rotor including a hub provided with a plurality of spaced annular V-shaped grooves and the edges of said stator plates each being provided with a semi-circular recess forming a bearing to receive and rotatably support said rotor, the terminal edges of said recessed portions being V-shaped and engaging in the complementary V-shaped grooves of said rotor.

3. A variable condenser comprising a rotor having a hub and a stator provided with open V-shaped bearings to receive and rotatably support the hub of said rotor, said hub being provided with flats which engage with the flat portions of said bearings to limit the rotation of the rotor.

WALTER DORN.